(12) United States Patent
Winkelmann et al.

(10) Patent No.: US 8,628,249 B2
(45) Date of Patent: Jan. 14, 2014

(54) ANGULAR CONTACT BALL BEARING

(75) Inventors: Ludwig Winkelmann, Erlangen (DE);
Harald Peschke, Veitsbronn (DE);
Dieter Jauernig, Herzogenaurach (DE)

(73) Assignee: Schaeffler Technologies AG & Co. KG,
Herzogenaurach (DE)

( * ) Notice: Subject to any disclaimer, the term of this patent is extended or adjusted under 35 U.S.C. 154(b) by 726 days.

(21) Appl. No.: 12/094,090

(22) PCT Filed: Nov. 14, 2006

(86) PCT No.: PCT/EP2006/068427
§ 371 (c)(1),
(2), (4) Date: May 16, 2008

(87) PCT Pub. No.: WO2007/057384
PCT Pub. Date: May 24, 2007

(65) Prior Publication Data
US 2008/0247696 A1    Oct. 9, 2008

(30) Foreign Application Priority Data

Nov. 18, 2005    (DE) .......................... 10 2005 055 037

(51) Int. Cl.
*F16C 33/76* (2006.01)
*F16J 15/32* (2006.01)

(52) U.S. Cl.
USPC ............ 384/481; 384/484; 277/552; 277/928

(58) Field of Classification Search
USPC .......... 384/477, 480–484, 486–489; 277/552, 277/553, 572, 573, 576, 577, 918, 928
See application file for complete search history.

(56) References Cited

U.S. PATENT DOCUMENTS

| | | | |
|---|---|---|---|
| 2,071,198 A | 2/1937 | Chambers | |
| 2,118,027 A | 5/1938 | Barish | |
| 2,316,713 A * | 4/1943 | Procter | 277/553 |
| 2,591,129 A * | 4/1952 | Brouwer | 384/466 |
| 2,659,617 A | 11/1953 | Cobb | |
| 2,741,500 A | 4/1956 | Large | |
| 2,890,086 A * | 6/1959 | Clark | 384/173 |
| 2,979,345 A * | 4/1961 | Potter | 277/577 |

(Continued)

FOREIGN PATENT DOCUMENTS

| | | |
|---|---|---|
| DE | 2029429 Y | 1/1971 |
| DE | 3009977 Y | 9/1981 |

(Continued)

OTHER PUBLICATIONS

English translation of DE3513722 obtained on May 3, 2011.*

*Primary Examiner* — James Pilkington
(74) *Attorney, Agent, or Firm* — Lucas & Mercanti, LLP

(57) ABSTRACT

A sealed, single row angular contact ball bearing which has a seal arranged at both axial ends in a region of the rims. One bearing ring has on both sides one receiving opening for the sealing lip carrier and the associated other bearing ring has on both sides one sealing face for the sealing lip. The rims are coordinated with one another in such a way that receiving openings and sealing faces lie in one plane at the same radial spacing from a bearing axis. It is ensured in this way that the same seal can be used for sealing the angular contact ball bearing of generic configuration on both sides.

8 Claims, 12 Drawing Sheets

(56) References Cited

U.S. PATENT DOCUMENTS

| | | | |
|---|---|---|---|
| 3,749,954 A * | 7/1973 | Anderson, Jr. | 384/408 |
| 4,428,630 A | 1/1984 | Folger | |
| 4,433,846 A * | 2/1984 | Romero et al. | 277/552 |
| 4,692,040 A * | 9/1987 | Ebaugh et al. | 384/484 |
| 4,872,770 A * | 10/1989 | Dickinson | 384/484 |
| 5,037,213 A * | 8/1991 | Uchida et al. | 384/482 |
| 5,711,616 A * | 1/1998 | Gassmann et al. | 384/482 |
| 5,860,748 A * | 1/1999 | Okumura et al. | 384/486 |
| 6,776,531 B2 * | 8/2004 | Tsuchida et al. | 384/484 |
| 2002/0186911 A1 | 12/2002 | Van Dine | |
| 2003/0026509 A1 * | 2/2003 | Yakura et al. | 384/484 |

FOREIGN PATENT DOCUMENTS

| | | |
|---|---|---|
| DE | 3513722 A | 10/1986 |
| DE | 9002218 Y | 4/1990 |
| DE | 4209043 A | 1/1993 |
| DE | 19543571 Y | 5/1997 |
| DE | 19958788 A | 6/2001 |
| DE | 10234935 Y | 5/2003 |
| GB | 2065829 A | 7/1981 |
| JP | 62209223 A | 9/1987 |
| JP | 2003042160 X | 2/2003 |
| JP | 2005121161 A | 5/2005 |

* cited by examiner

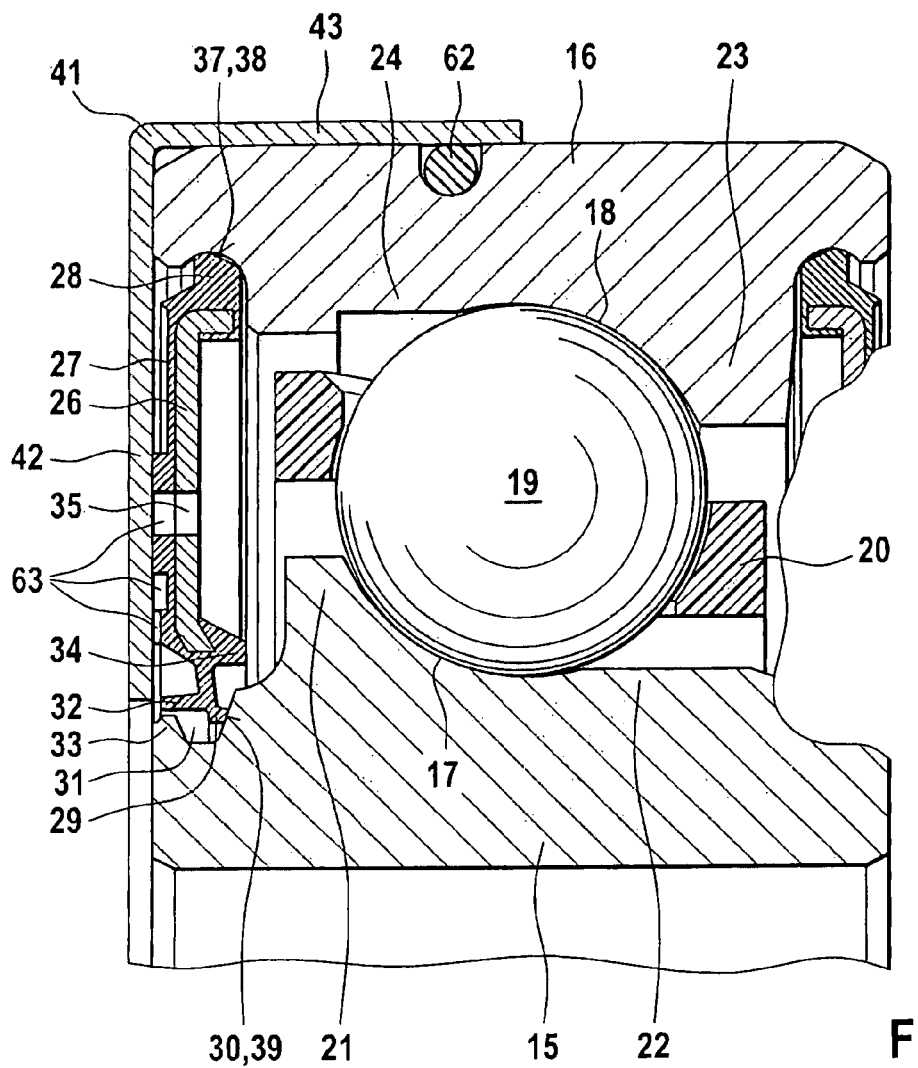
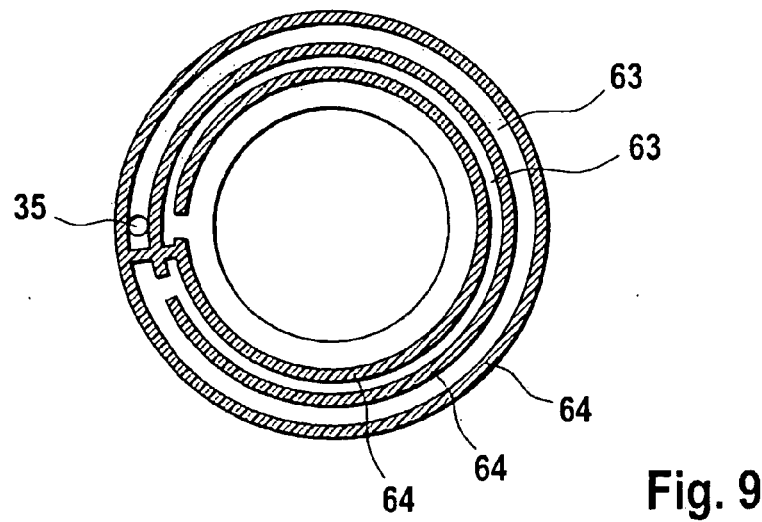
Fig. 8
Fig. 9

ANGULAR CONTACT BALL BEARING

FIELD OF THE INVENTION

The invention relates to an angular contact ball bearing, comprising an inner and an outer bearing ring, of which each comprises a ball running groove, between which a ring of bearing balls roll, the ball running groove of each bearing ring being delimited by a high rim on its one side and by a low rim on its opposite side, and a low rim of one bearing ring lying radially opposite a high rim of the other bearing ring and the angular contact ball bearing being provided at least at one axial end with a seal which comprises a sealing lip carrier and at least one elastic sealing lip, the seal being fastened to the one bearing ring in the region of the rim and the sealing lip interacting with a sealing face on the rim of the other bearing ring.

BACKGROUND OF THE INVENTION

A single row angular contact ball bearing which is configured according to the generic type in this way is already known from DE 35 13 722 A1. The angular contact ball bearing which is shown in FIGS. 1, 2 and 3 comprises an inner bearing ring and an outer bearing ring, of which each comprises a ball running groove, between which a ring of bearing balls rolls, which bearing balls are kept at a spacing in a cage. The ball running groove of the inner running ring is delimited by a high rim on its one side and by a low rim on the opposite side. The ball running groove of the outer running ring also has a high rim on its one side and a low rim on the opposite side, where, in the case of a high rim of one bearing ring, a low rim of the other bearing ring lies radially opposite it.

In the abovementioned figures, the angular contact ball bearing is provided at its one axial end with a seal which comprises a rigid sealing lip carrier and an elastic sealing lip, the seal being fastened to the one bearing ring in the region of the rim and the sealing lip interacting with a sealing lip on the rim of the other bearing ring.

As the figures show further, the free spaces which are arranged on the right and left and are open to the outside in the axial direction have different radial dimensions. This is a result of the fact that a high rim of one bearing ring lies radially opposite a low rim of the other bearing ring and vice versa. If the seal which is arranged on the right and the sealing lip carrier of which is fastened to the inner side of the angular contact ball bearing were transferred to the left side of the angular contact ball bearing, the sealing lip carrier would have to be fastened to the inner side of the high rim. The same is true for the sealing lip which interacts with the sealing face on the other rim. This in turn means that the seal which is arranged on the right cannot be used for the left side because its diameter is too large. Accordingly, two seals having different diameters would have to be used, which makes the entire bearing arrangement unnecessarily expensive, however. Two different seals cause higher individual costs than one seal with the same quantity. Moreover, double tooling costs result for producing the two different seals and, finally, two different tools for mounting the seals and increased logistical expenditure including storage are also required.

Moreover, an angular contact ball bearing which is sealed only on one side allows lubricant to escape in an uncontrolled manner at the unsealed location. This is disadvantageous, in particular, if connecting structures are not allowed to come into contact with lubricant. In a clutch mechanism, for example, friction linings must not be contaminated with lubricant in any case.

SUMMARY OF THE INVENTION

Proceeding from the disadvantages of the known prior art, the invention is therefore based on the object of sealing on both sides an angular contact ball bearing which is configured according to the generic type, in such a way that the seal which is used can be employed both on the right and on the left.

According to the invention, this object is achieved in that the seal is arranged at both axial ends in the region of the rims, one bearing ring having on both sides in each case one receiving opening for the sealing lip carrier and the associated other bearing ring having on both sides in each case one sealing face for the sealing lip, and the rims being coordinated with one another in such a way that receiving openings and sealing faces lie in one plane at the same radial spacing from a bearing axis.

In addition to the substantially improved sealing of the angular contact ball bearing of the generic type, the decisive advantage lies in the fact that the seal is of identical configuration and accordingly can be used both on the right and on the left. As a result, the bearing arrangement becomes inexpensive because firstly only one tool is required for producing the one seal and because secondly the unit costs of the seal are lower the higher the overall produced quantity. The bearing arrangement also becomes less expensive because thirdly only one mounting tool is required for mounting the identical seal on the right and left bearing side. Finally, fourthly there is a further advantage during mounting, since seals of identical configuration cannot be mixed up.

Furthermore, it has proven expedient if the sealing lip carrier comprises a metallic material which is connected to the sealing lip made from an elastomer by vulcanization. The sealing lip carrier firstly ensures sufficient stability of the seal, while the sealing lip made from elastomer is responsible for the satisfactory sealing action. It is to be noted expressly at this point that the same seal having identical geometric dimensions can be used for both sides of the angular contact ball bearing of the generic type.

According to a further variant of the invention, it is also possible, in particular in a temperature range up to 100° C., that the sealing lip carrier and the sealing lip are formed in one piece from a polymeric material, the material of the sealing lip carrier having a greater rigidity than the sealing lip. Production takes place using the known two component injection molding method, it being possible, for example, for PA 66 (polyamide comprising hexamethyl-diamine and adipic acid) to be used as carrier material and thermoplastic polymers as sealing lip material. The typical characteristic of the latter consists in them becoming soft when the temperature increases after their softening point has been exceeded and hardening again upon cooling.

It has also proven advantageous if, at an end which faces away from the sealing lip, the sealing lip carrier is provided with a seal made from the same material as the sealing lip because the seal can be introduced simply into the bearing inner ring or bearing outer ring as a result.

In a further design variant of the invention, there is provision for the seal to be provided with at least one ventilation hole, The latter serves to equalize undesired pressure states in the angular contact bail bearing, in this context, it has proven advantageous if the ventilation layer is covered with a nonwoven layer, An impregnation which repels oil and/or water achieves a situation where firstly lubricant cannot escape to the outside from the interior of the bearing and secondly the ingress of dirt into the interior of the bearing from the surroundings of the bearing is prevented, Here, the nonwoven layer can he permanently arranged inside or outside the seal. If the nonwoven layer is arranged outside the seal, it is received by a sealing cap having a radial and an axial limb, said sealing cap being connected to one of the bearing rings via its axial limb.

It has also proven advantageous if the sealing lip bears against the sealing face in the radial direction or in the axial direction under prestress by way of a spring element. This ensures that an absolutely sealing action of the seal is ensured even at relatively high rotational speeds, with the result that no lubricant can escape from the angular contact ball bearing and no dirt can penetrate into the angular contact ball bearing.

According to a further feature of the invention, it can also be advantageous that the sealing lip bears against an angle ring in order to attain a relatively large sealing face.

Finally, it can be advantageous according to a further variant of the invention if the sealing lip carrier of the seal is provided with a ventilation hole which opens into a labyrinth which is formed from circularly annular webs made from an elastomer and is covered by a radial limb of a sealing cap.

Further features of the invention result from the following description and from the drawings, in which exemplary embodiments of the invention are shown in simplified form.

BRIEF DESCRIPTION OF THE DRAWINGS

In the drawings:

FIGS. 1-9 show in each case an angular contact ball bearing in longitudinal section which is sealed on both sides in the manner according to the invention with seals of different configuration.

DETAILED DESCRIPTION OF THE DRAWINGS

Figure 10:
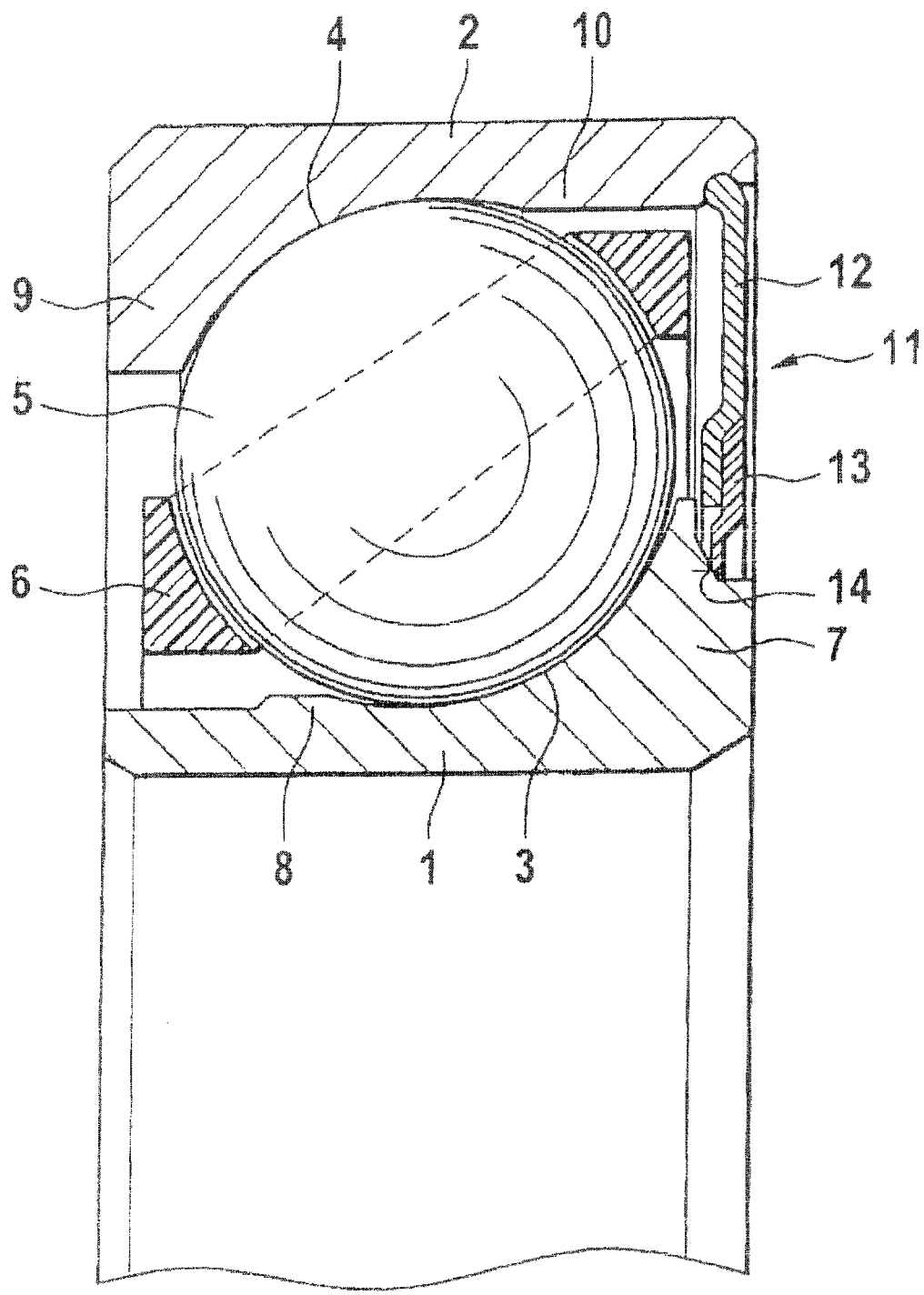
FIG. 10 shows a longitudinal section through an angular contact ball bearing which is sealed on one side according to the previous prior art.

Reference is made first of all to FIG. 10 in order to explain the known prior art.

The angular contact ball bearing which is shown in this figure comprises the inner bearing ring 1 and the outer bearing ring 2, of which each comprises a ball running groove 3, 4, between which a ring of balls 5 roll, which balls 5 are kept at a spacing in a cage 6. The ball running groove 3 of the inner bearing ring 1 is delimited by a high rim 7 on its one side and by a low rim 8 on the opposite side. The ball running groove 4 of the outer bearing ring 2 also has a high rim 9 on its one side and a low rim 10 on the opposite side, a low rim 8, 10 of the other bearing ring 2, 1 lying radially opposite a high rim 7, 9 of one bearing ring 1, 2. The angular contact ball bearing is provided at its one axial end with a seal 11 which comprises a rigid sealing lip carrier 12 and an elastic sealing lip 13, the seal 11 being fastened to the outer bearing ring 2 in the region of the low rim 10 and the sealing lip 13 interacting with a sealing face 14 on the high rim 7 of the inner bearing ring 1.

If the seal 11 which is fastened on the right in the region of the low rim 10 were then transferred to the left hand side of the angular contact ball bearing, the seal carrier 12 of the seal 11 would have to be arranged in the region of the high rim 9 and the elastic sealing lip 13 would have to bear against a sealing face in the region of the low rim 8. It can be seen without difficulty that the seal 11 which is arranged on the right cannot be used for sealing on the left, since its diameter is too large.

Both the outer diameter of the sealing lip carrier 12 and the inner diameter of the sealing lip 13 would have to be reduced, in order for it to be possible to use it on the left hand bearing side. In other words, two seals 11 having different dimensions are accordingly required.

The invention then proceeds from here.

Figure 1:
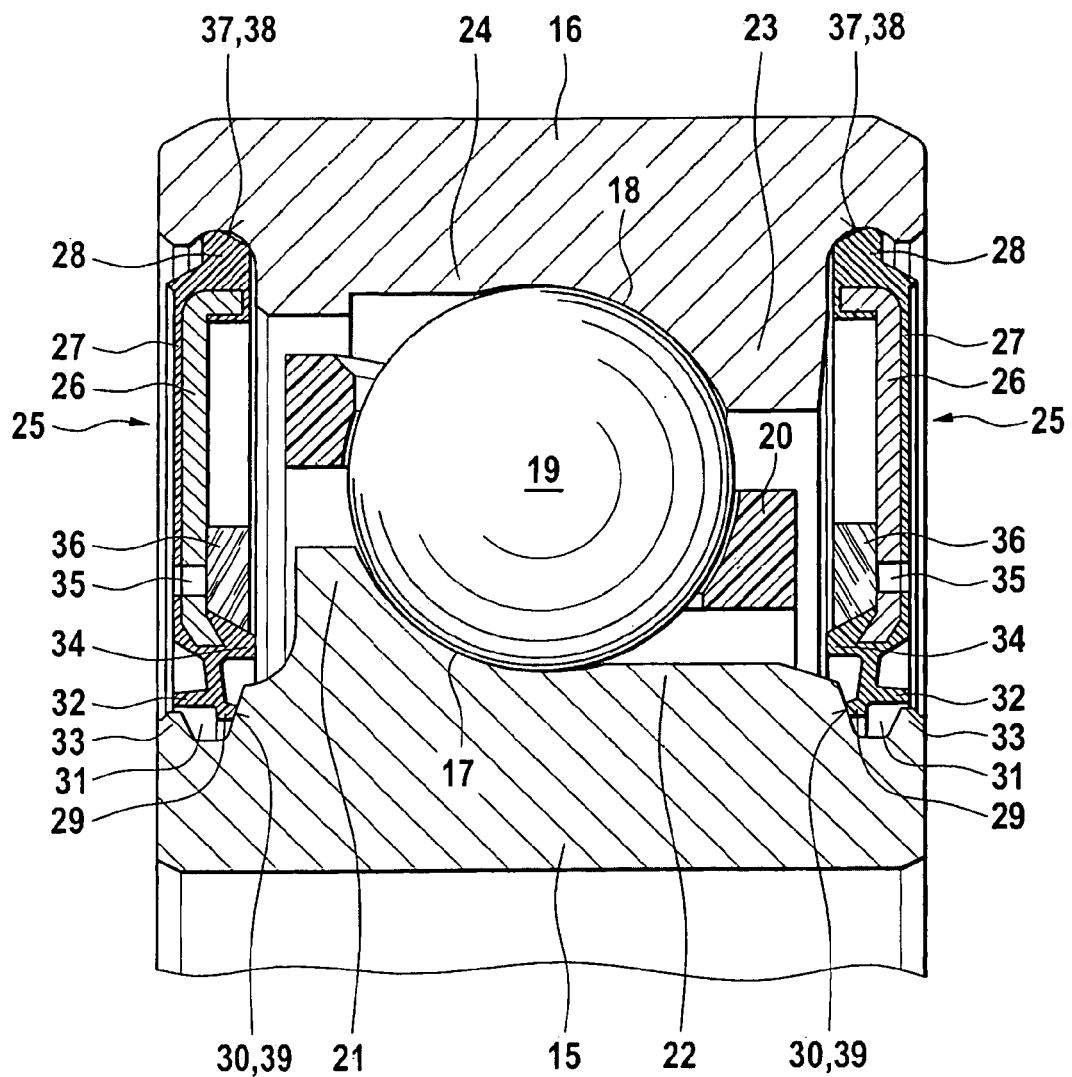

The angular contact ball bearing which is configured according to the invention and is shown in FIG. 1 comprises the inner bearing ring 15 and the outer bearing ring 16, of which each comprises a ball running groove 17, 18, between which a ring of bearing balls 19 roll, which bearing balls 19 are arranged in pockets of a cage 20. The ball running groove 17 of the inner bearing ring 15 is delimited by a high rim 21 on its left hand side and by a low rim 22 on the right hand side. The ball running groove 18 of the outer bearing ring 16 also has a high rim 23 on its one side, namely the right hand side, and a low rim 24 on the opposite side, a low rim 24, 22 of the other bearing ring 16, 15 lying radially opposite a high rim 21, 23 of one bearing ring 15, 16.

As FIG. 1 shows further, the angular contact ball bearing is provided with a seal 25 both on the right and the left. Said seal 25 comprises the metallic sealing lip carrier 26 (reinforcement) which is enclosed by an elastomer 27 at its outer end side and at its radial ends. The sealing lip carrier 26 is equipped with an elastomeric thickened portion 28 at the upper end, while the elastomer 27 has the elastic sealing lip 29 at the lower end, which elastic sealing lip 29 bears against the sealing face 30 of a notch 31. A projection 32 which points axially to the outside and forms a gap seal with a shoulder 33 of the notch 31 is arranged so as to adjoin the elastic sealing lip 29. Finally, the projection 34 which is directed axially to the inside also belongs to the radially lower part. For pressure equalization, the seal 25 is also provided on both sides with in each case one ventilation hole 35, behind which, in the direction of the interior of the bearing, a nonwoven layer 36 is arranged which firstly prevents the escape of lubricant from the bearing and secondly precludes the ingress of external dirt particles into the interior of the bearing.

As FIG. 1 shows further, the outer bearing ring 16 is provided on both sides in the region of both rims 23, 24 with in each case one receiving opening 37 which, as viewed in the radial direction, have the same spacing from a bearing axis, that is to say lie in a plane which is denoted by 38. The same is true of the sealing face 30 or the notch 31 which likewise has the same radial spacing from the bearing axis, that is to say lies in the plane which is denoted by 39. The identical position of the receiving opening 37 and the sealing face 30 on both sides ensures that geometrically identical seals 25 can be used on both sides.

The seal 40 which is shown in FIG. 2 again likewise has the steel sealing lip carrier 26, the molded sealing lip 29 of which bears in a grinding manner against the sealing face 30 of the notch 31. The nonwoven layer 36 which is arranged on the outer side of the sealing lip carrier 26 is enclosed by a radial limb 42 of a sealing cap 41, the axial limb 43 of which reaches around the sealing lip carrier 26 including thickened portion 28 at its end which lies radially on the outside. In the region of the rims 23, 24, the outer bearing ring 16 is provided on its circumferential face on both sides with in each case one receiving opening 44, by which the seal 40 is received. Once again, the receiving opening 44 and the sealing face 30 have an identical radial spacing from the bearing axis and therefore lie in the plane 38, 39.

The seal 40 can once again be used for both sides of the angular contact ball bearing as a result of the mirror symmetrical arrangement of the receiving opening 44 and the notch 31 having the sealing face 30.

Figure 2:
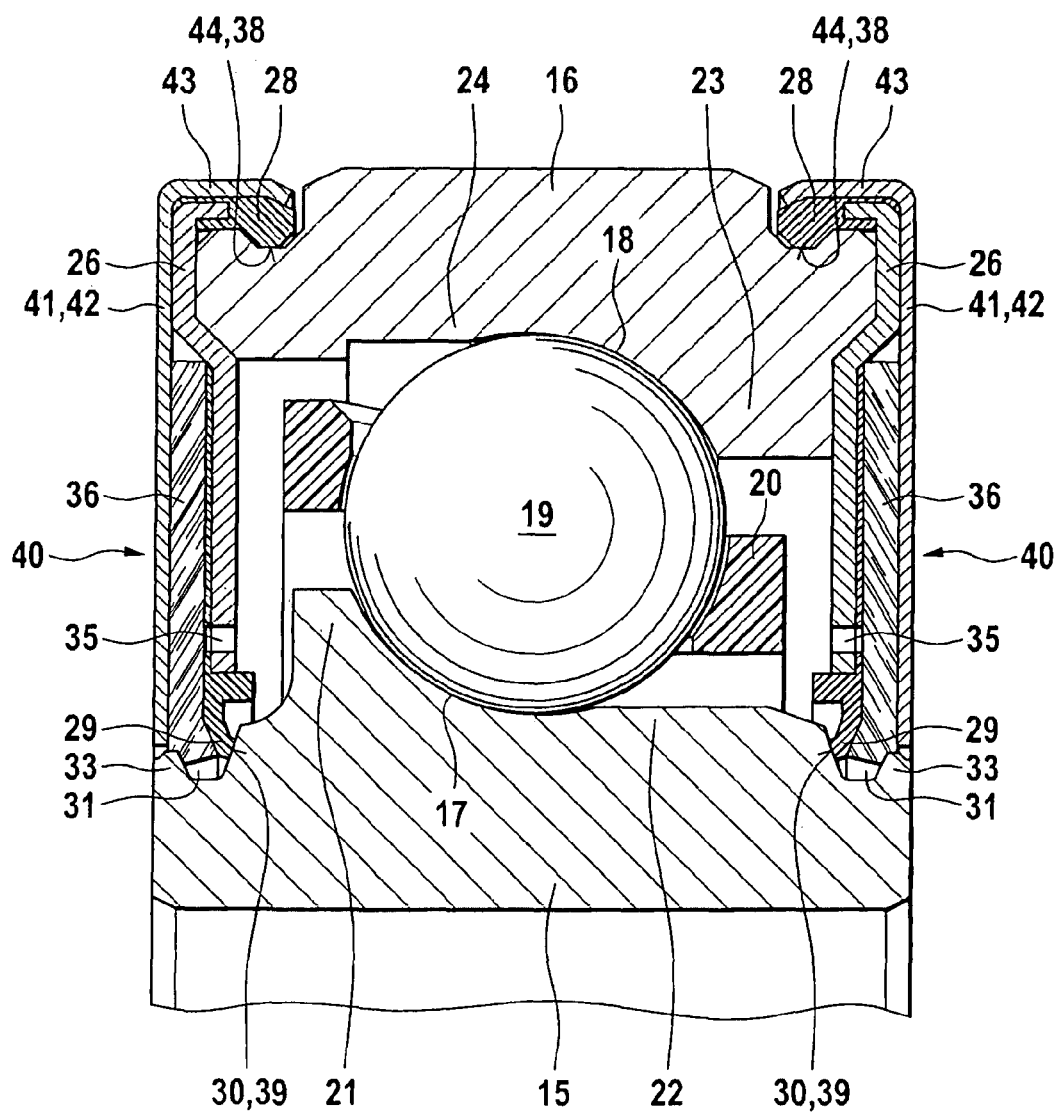
Figure 3:
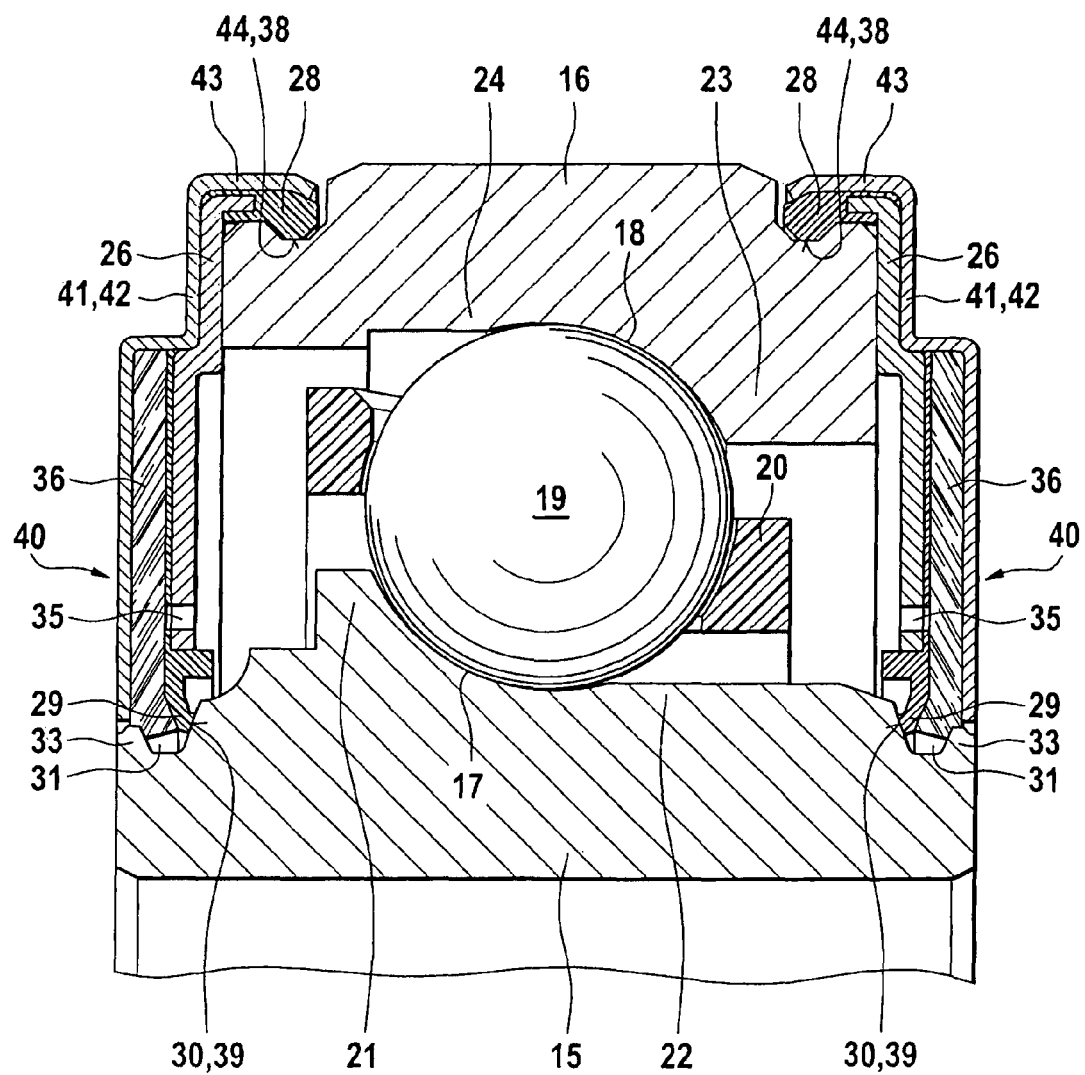

The seal 40 which is shown in FIG. 3 differs from that in FIG. 2 only in that both the sealing lip carrier 26 and the sealing lip 41 are provided with an additional, axial limb which is not denoted in greater detail, which axial limbs are arranged approximately in the upper third. In this way, the clearance which receives the bearing balls 19 is enlarged in the axial direction to the outside between the bearing rings 15, 16, which is synonymous with an increased lubricant storage space. In other words, an axially longer bearing inner ring 15 can be used as a result of this design of the seal 40.

Figure 4:
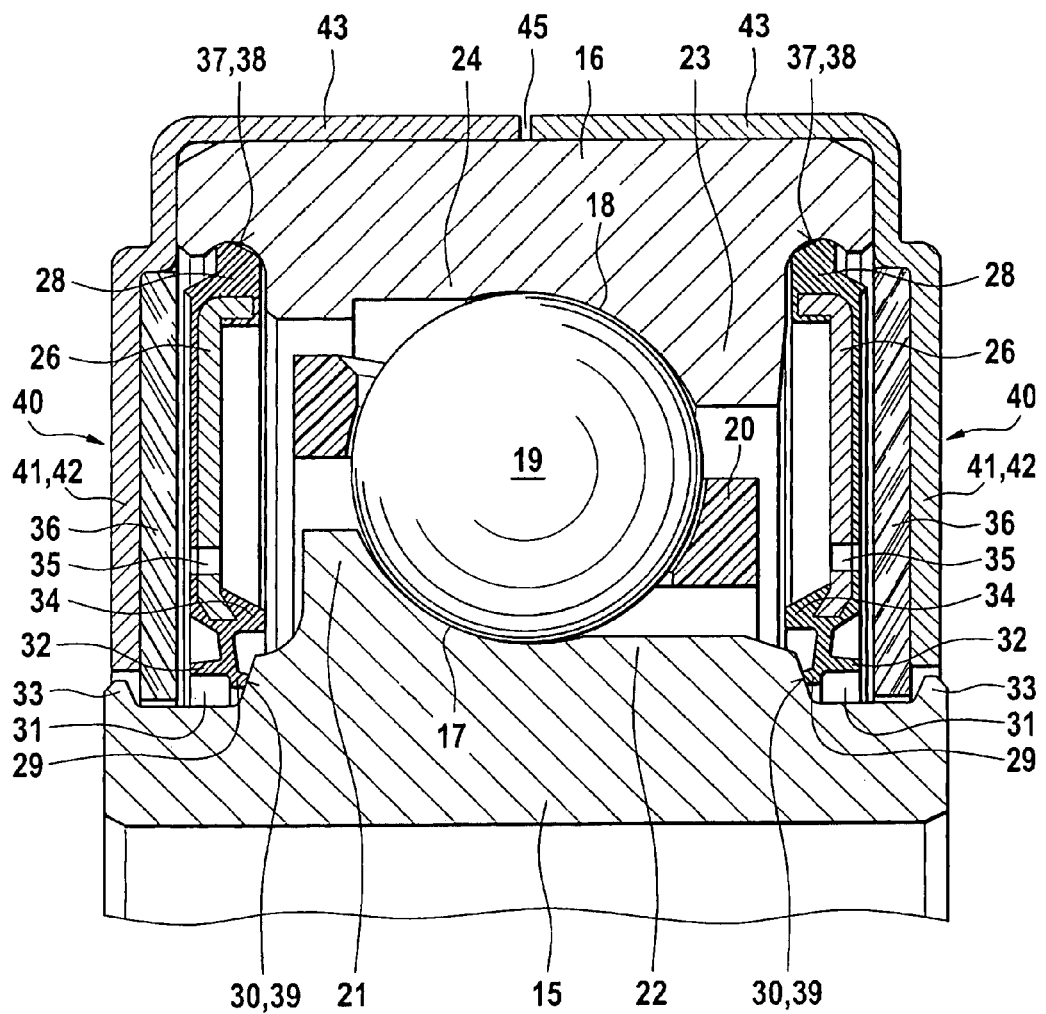

The seal 40 which is shown in FIG. 4 differs from that in FIG. 3 in that the radial limb 43 of the sealing cap 41 surrounds the outer circumferential face of the outer bearing ring 16 on both sides, both sealing caps 41 being spaced apart from one another in the circumferential direction by the gap 45. A further difference lies in the fact that, according to FIG. 4, the sealing cap 41. and the sealing hp carrier 26 are separated from one another in the fastening on the outer bearing ring 16. While the sealing lip carrier 26 is arranged in the receiving opening 37 via the elastomeric thickened portion 28, just like in FIG. 1, the sealing cap 41 is held in the manner which has already been described via. the circumferential face of the outer bearing ring 16. Also, the nonwoven member 36 forms a gap seal with the shoulder 33 of the notch 31.

Figure 5A:
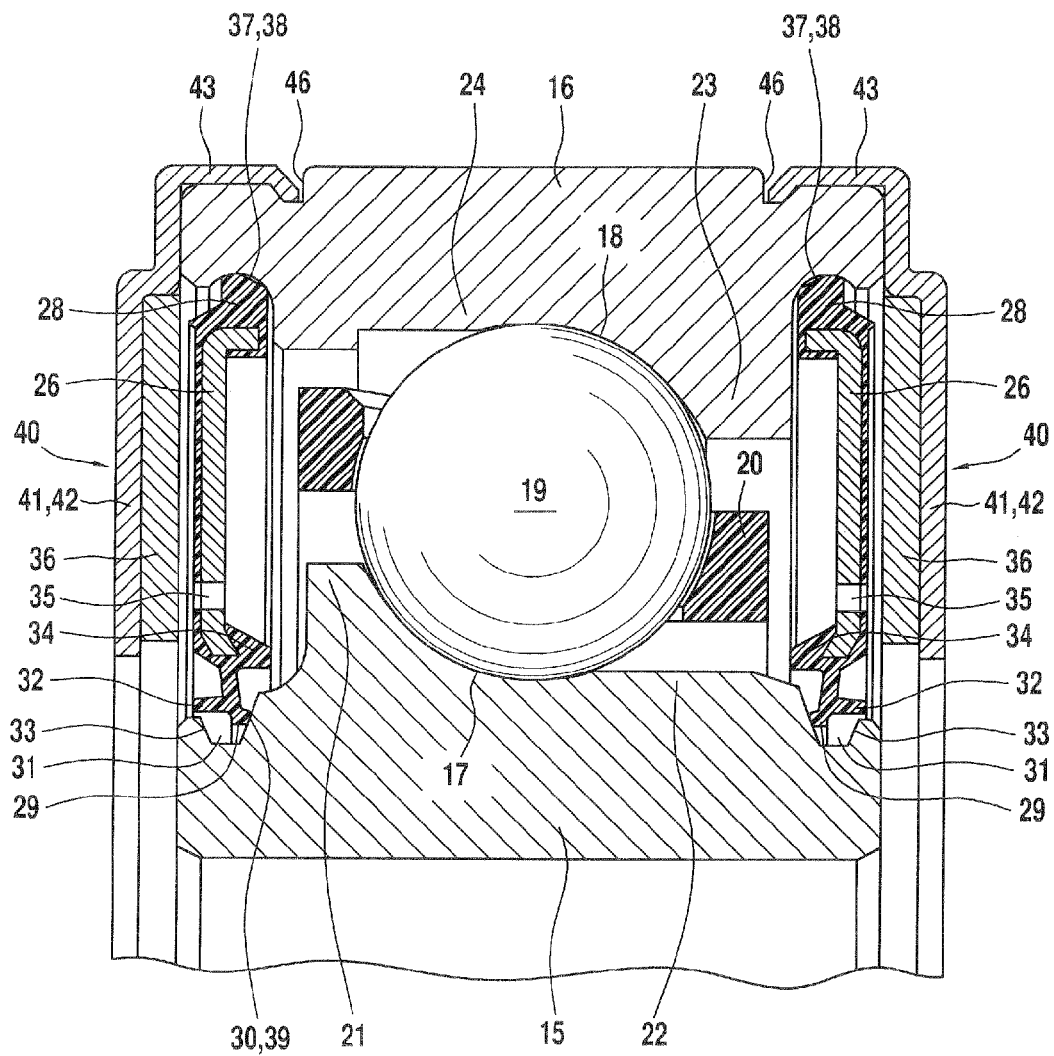
Figure 5B:
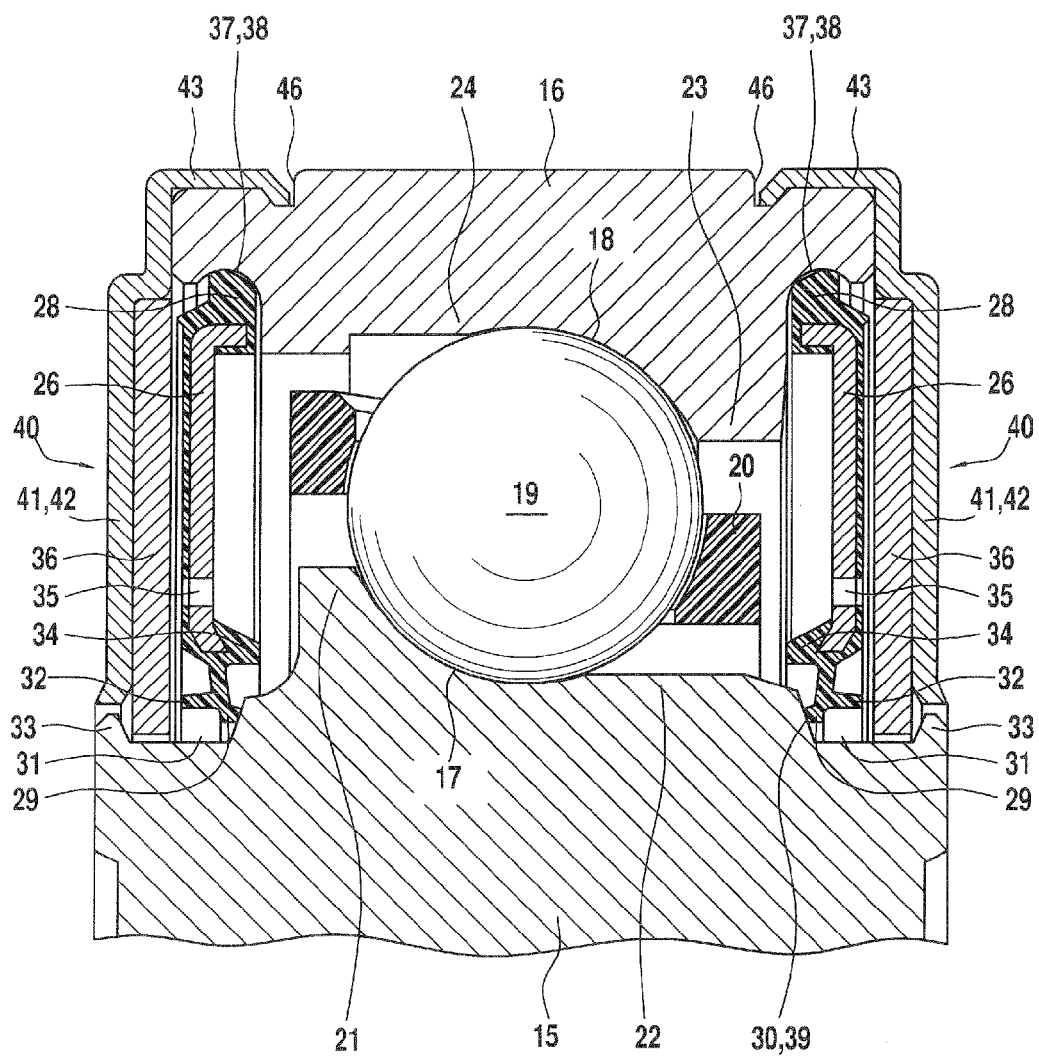

The seal arrangements 40 which are shown in FIGS. 5a and 5b differ among one another in that, on the right hand side, the nonwoven layer 36 protrudes as far as into the notch 31 and the radial limb 42 of the sealing cap 41 forms a gap seal with the shoulder 33. In comparison with the seal in FIG. 4, the difference in both cases comprises the fact that the axial limbs 43 of the sealing cap 41 surround the circumferential face of the outer bearing ring 16 only in the end region and are snapped into the receiving opening 46.

Figure 6A:
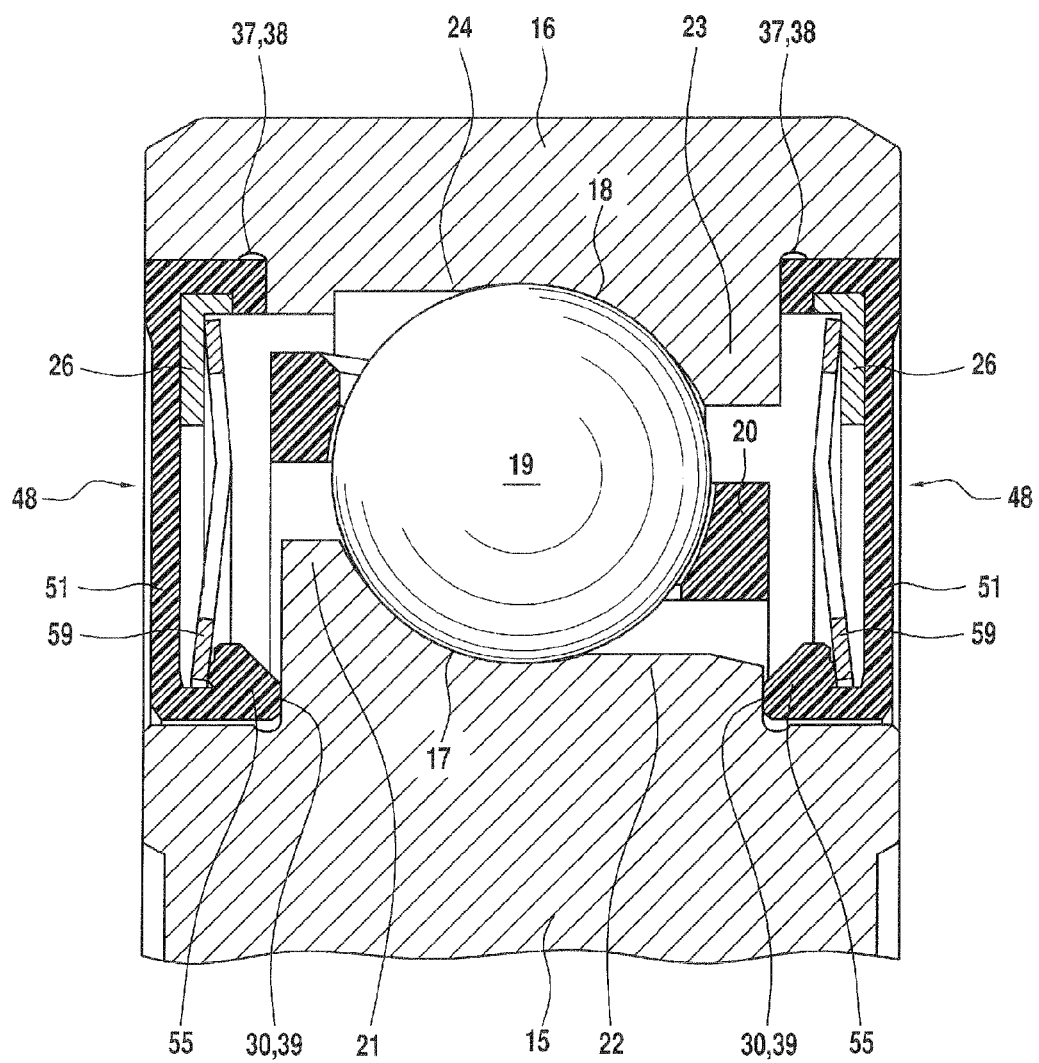
Figure 6B:
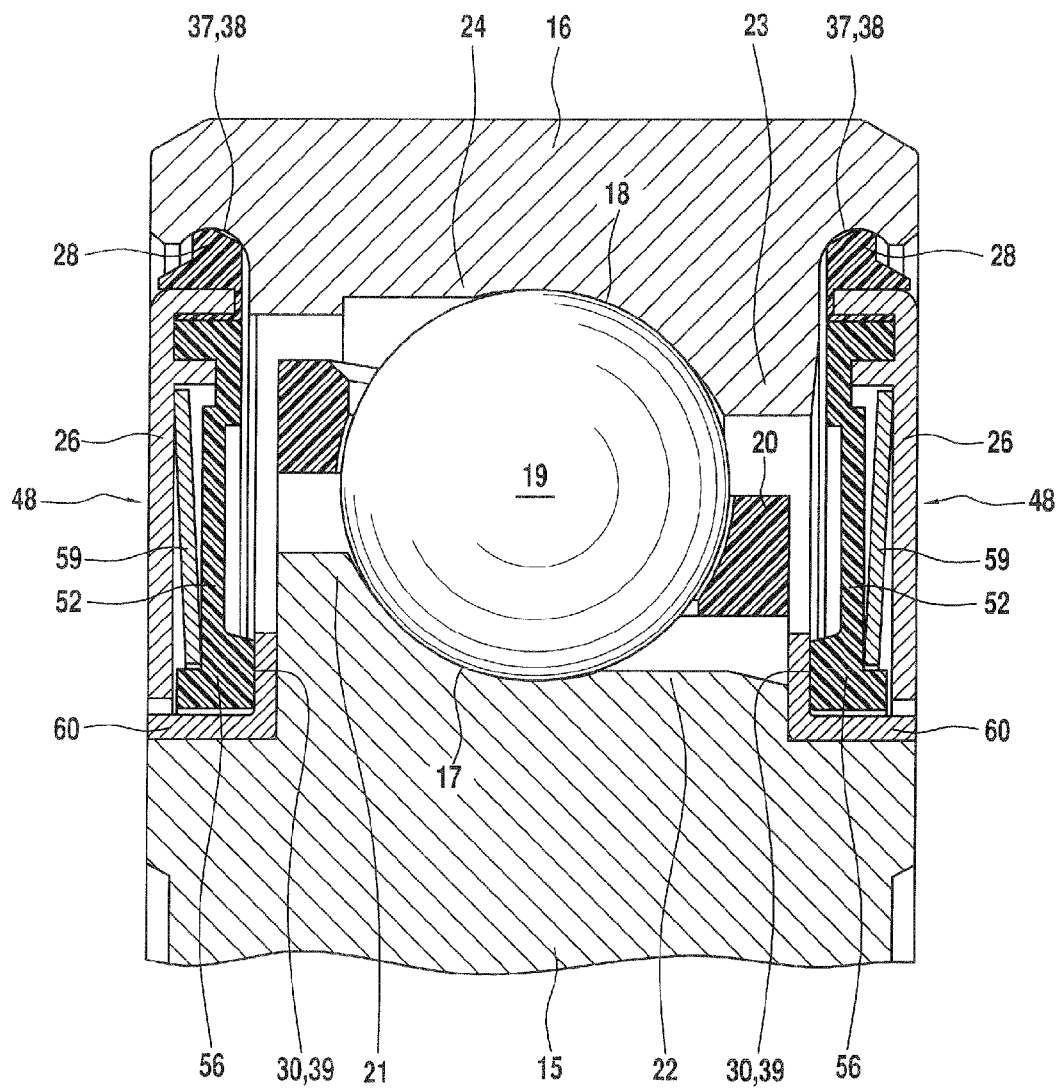
Figure 7A:
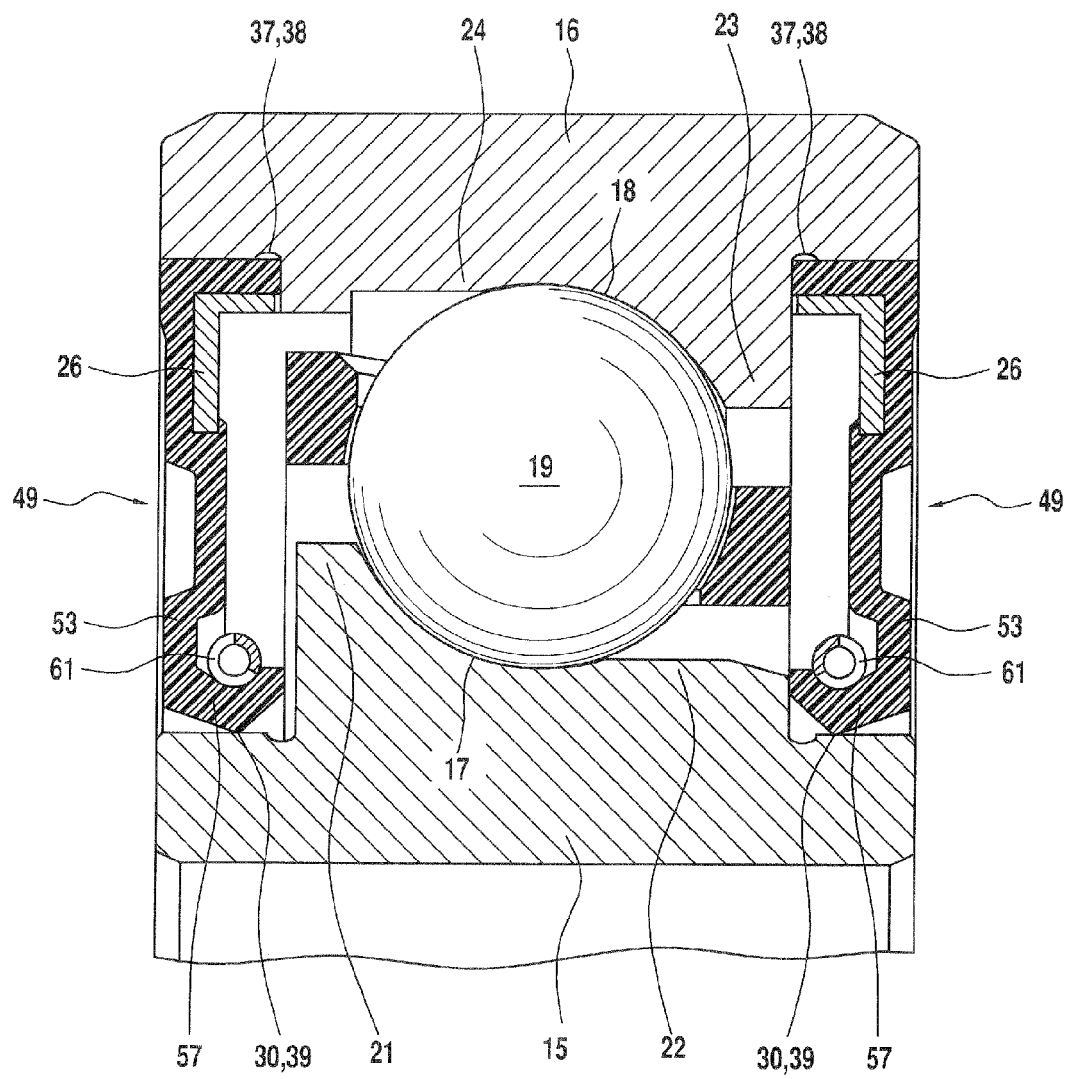
Figure 7B:
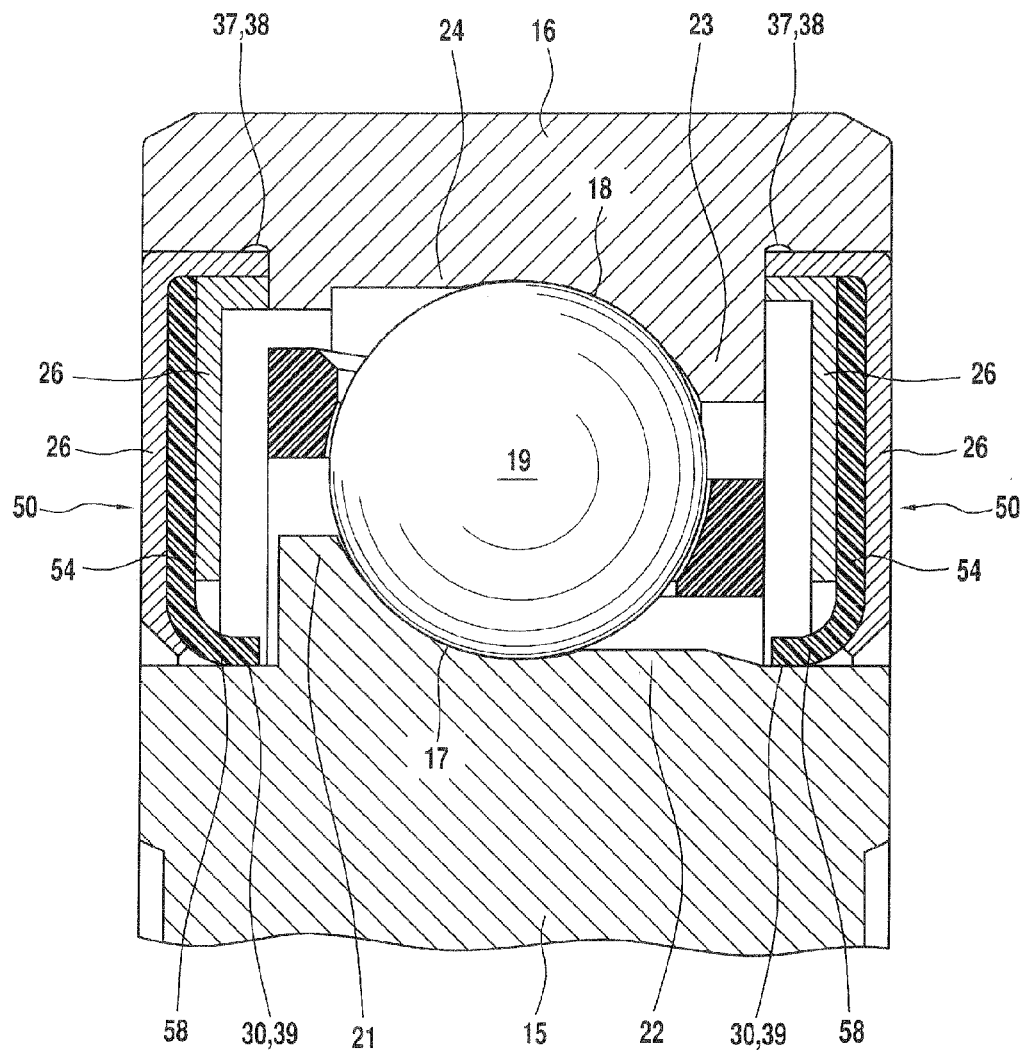

FIGS. 6a, 6b, 7a, 7b show seals 47, 48, 49, 50, the sealing bodies 51, 52, 53, 54 of which are of different design and are connected to the sealing lip carrier 26 in different ways but comprise an identical polymeric material which is suitable for relatively high temperatures. To this end, polytetrafluroethylene (PTFE) is suitable, in particular, since said plastic withstands brief temperature peaks of up to 300°. Moreover, of all the solid plastics, PTFE has the lowest coefficient of friction and high fatigue resistance. The sealing body 51, 52 which is shown in FIGS. 6a, 6b has in each case one sealing lip 55, 56 which bears against the sealing face 30 under prestress in the axial direction by a spring element in the form of a disk spring 59, which sealing face 30 is formed on the right hand side by an angle ring 60 which is connected to the inner ring 15. In contrast to this, the sealing lips 57, 58 according to FIGS. 7a, 7b are prestressed radially against the sealing face 30, this being realized according to FIG. 7a with the aid of an annular spring 61 and in FIG. 7b by internal stress of the sealing lip 58.

Finally, FIGS. 8 and 9 show a special seal 25, in which the ventilation hole 35 which is present in the seal carrier 26 opens into a labyrinth 63 which is formed from circularly annular webs 64 which are made from a polymer and are once again covered from the radial limb 42 of the sealing cap 41. The sealing cap 41 is held on the outer bearing ring 16 by way of its axial limb 43 with the aid of an O-ring 62.

The invention claimed is:

1. An angular contact ball bearing comprising:
    an inner bearing ring having a ball running groove delimited by a high rim on one axial side and a low rim on an opposite axial side;
    an outer bearing ring having a ball running groove delimited by a high rim on one axial side and a low rim on an opposite axial side, the low rim of the inner bearing ring lying radially opposite the high rim of the outer bearing ring and the low rim of the outer bearing ring lying radially opposite the high rim of the inner bearing ring;
    a ring of bearing balls rolling between the ball running groove of the inner bearing ring and the ball running groove of the outer bearing ring;
    two identical seals of equal length, the seals being arranged at each axial end of the inner bearing ring and the outer bearing ring and fastened in a region of the high rim and the low rim to one of the bearing rings, each of the seals having a sealing lip carrier and at least one elastic sealing lip, the sealing lip of each of the seals interacting with and bearing against a sealing face, which is substantially perpendicular to an axis of the bearing, in a region of the high rim and the low rim of the other bearing ring, the sealing lip being directed inwardly toward the ball running groove,
    wherein the one of the bearing rings has receiving openings axially inward of each of the axial ends of the one of the bearing rings for the sealing lip carrier and the other bearing ring has notches of equal depth with the sealing faces axially inward of each of the axial ends of the other bearing ring for the sealing lip, and
    wherein the receiving openings lie in a first axial plane which is parallel to the bearing axis and the sealing faces lie in a second axial plane which is parallel to the bearing axis and at a same radial spacing from the bearing axis,
    wherein both of the seals have at least one ventilation hole,
    wherein the sealing lip carrier of the each of the seals has the at least one ventilation hole of the seals which opens into a labyrinth which is formed from annular webs made from an elastomer and which is covered by a radial limb of a sealing cap.

2. The angular contact ball bearing as claimed in claim 1, wherein the sealing lip carrier comprises a metallic material which is connected to the sealing lip that is made from an elastomer by vulcanization.

3. The angular contact ball bearing as claimed in claim 2, wherein the sealing lip carrier has a sealing means at an end which faces away from the sealing lip that is made from a same material as the sealing lip.

4. The angular contact ball bearing as claimed in claim 1, wherein the sealing lip bears against an angle ring in order to provide a sufficient sealing face.

5. The angular contact ball bearing as claimed in claim 1, wherein the annular webs are formed in the scaling cap in an elevated or depressed manner.

6. The angular contact ball bearing as claimed in claim 1, wherein each of said notches has a shoulder, the sealing cap forming a gap seal with the shoulder of the notch.

7. The angular contact ball bearing as claimed in claim 1, wherein each of said notches has a shoulder, the seal having an axially, outwardly directed projection that forms a gap seal with the shoulder of the notch.

8. The angular contact ball bearing as claimed in claim 1, wherein the seal has an axially, inwardly directed projection.

* * * * *